United States Patent [19]
Fatehi et al.

[11] Patent Number: 5,959,767
[45] Date of Patent: *Sep. 28, 1999

[54] LOSS-LESS OPTICAL CROSS-CONNECT

[75] Inventors: Mohammad T. Fatehi, Middletown; Wayne Harvey Knox, Rumson, both of N.J.

[73] Assignee: Lucent Technologies, Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,890

[22] Filed: Dec. 31, 1996

[51] Int. Cl.$^6$ .................................................. H04J 14/00
[52] U.S. Cl. ........................ 359/341; 359/128; 359/134; 359/139
[58] Field of Search ................................... 359/120, 121, 359/128, 134, 139, 160, 178, 341, 345, 349

[56] References Cited

U.S. PATENT DOCUMENTS

| | | | |
|---|---|---|---|
| 5,181,134 | 1/1993 | Fateni et al. | 359/117 |
| 5,341,234 | 8/1994 | Suzuki et al. | 359/117 |
| 5,365,368 | 11/1994 | Hsu et al. | 359/341 |
| 5,450,224 | 9/1995 | Johansson | 359/128 |
| 5,504,824 | 4/1996 | Bunrgard | 385/16 |
| 5,550,818 | 8/1996 | Brachett et al. | 359/139 |

FOREIGN PATENT DOCUMENTS

| | | | |
|---|---|---|---|
| 4-9929 | 1/1992 | Japan | H04B 9/00 |

OTHER PUBLICATIONS

Urquhart, Paul; IEE Proceedings, vol. 135, Part I, #6, pp. 385–407, Dec. 1988.

*Primary Examiner*—Nelson Moskowitz
*Attorney, Agent, or Firm*—Gregg J. Murgia

[57] ABSTRACT

A loss-less optical cross-connect advantageously employs a plurality of optical rare earth-doped fiber optical amplifiers as gain-switched optical connections, for example, gain-switched optical distributors and gain-switched optical selectors. Each of the optical rare earth-doped fiber optical amplifiers acts as an ON/OFF switch. Also, both the gain-switched optical distributors and selectors employed in the optical cross-connect arrangement of this invention are a natural fit into today's optically amplified optical communication systems. In one embodiment, this is realized by employing a pump select circuit in conjunction with a plurality of pumps and the plurality of corresponding rare earth-doped fiber optical amplifiers. The particular pump and corresponding optical amplifier are selected by use of a control circuit arrangement to determine which output port or ports is (are) connected to the input port. The rare earth-doped fiber optical amplifiers and the corresponding pumps are employed advantageously for both the gain-switched optical distributors and the gain-switched optical selectors. In another embodiment, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical amplifiers to be activated, thus routing the input signals at any of a plurality of given wavelengths to the corresponding output line (or lines if broadcasting capability is employed). Again, the rare earth-doped fiber optical amplifiers and the corresponding pumps are employed advantageously for both the gain-switched optical distributors and the gain-switched optical selectors.

4 Claims, 10 Drawing Sheets

FIG. 10

LOSS-LESS OPTICAL CROSS-CONNECT

U.S. patent applications Ser. No. 08/777,894 (M. T. Fatehi-W. H. Knox Case 15-20), (Allowed Mar. 23, 1998) Ser. No. 08/777,891 (M. T. Fatehi-W. H Knox Case 16-21) and Ser. No. 08/777,892 (M. T. Fatehi-W. H. Knox Case 18-23) were filed concurrently herewith.

TECHNICAL FIELD

This invention relates to optical communication arrangements and, more specifically, to loss-less optical cross-connect arrangements.

BACKGROUND

Prior optical cross-connect arrangements are known that employed electro-mechanical optical switching elements as distributors and selectors.

An electrical 1xN distributor switch is an 1xN switching device which routes the signal or signals from a single input port to any one of the N output ports. An optical 1xN distributor switch is the optical analog of an electrical 1xN distributor switch where the input and output ports are optical fibers carrying one or more optical communication signals at a given wavelength or a plurality of wavelengths. Certain distributor switches may permit routing the signal from the input line to two or more of the N output ports, thus dividing the signal energy from the input line among the target output ports. This properly is called the broadcasting or bridging capability of the distributor switch.

An optical Nx1 selector switch is the optical analog of an electrical Nx1 selector switch where the input and output ports are optical fibers carrying one or more optical communication signals at different wavelengths. Certain selector switches may permit selection of more than one input port and adding (under certain rules) the signals from the selected ports. This properly is called the collection capability of the selector switch.

A number of electromechanical optical distributor and selector switches are presently available. These devices are based on mechanically moving the input and/or output fibers or utilizing various reflective or deflective optical elements to spatially direct a beam of light from the exit pupil of the input fiber and routing it to the entrance pupils of the output fibers. Clearly, these mechanical switches are slow and, in most cases, do not permit broadcast capability, a desirable feature in communication systems. In some cases, the optical loss associated with these elements is significant.

Such prior cross-connect arrangements employing electromechanical optical distributors and selectors were limited in selecting only one line at a time, their speed was slow, and their reliability was less than desirable.

Solid state wave-guide cross-connect arrangements based on lithium niobate (see for example U.S. Pat. No. 5,181,134) or indium phosphide optical switching devices are also available which solve the speed problems. The drawback involved with these optical switching devices include polarization dependence and significant optical losses. The large optical insertion losses connected with these devices soon become intolerable when such devices are concatenated.

SUMMARY OF THE INVENTION

The problems and limitations of the prior known optical cross-connect arrangements employing electromechanical optical devices, and various solid state optical devices are overcome, in one embodiment of the invention, by employing a plurality of rare earth-doped fiber optical amplifiers as gain-switched optical connections, for example gain-switched optical distributors, i.e., commutators, and gain-switched optical selectors. Each of the rare earth-doped fiber optical amplifiers acts as an ON/OFF switch. Also, both the gain-switched optical distributors and gain-switched optical selectors employed in the loss-less optical cross-connect arrangement of this invention are a natural fit into today's optically amplified optical communication systems. In one embodiment, this is realized by employing a pump select circuit in conjunction with a plurality of pumps and the plurality of corresponding rare earth-doped fiber optical amplifiers. The particular pump and corresponding optical amplifier are selected by use of a control circuit arrangement to determine which output port or ports is (are) connected to the input port. The rare earth-doped fiber optical amplifiers and the corresponding pumps are employed advantageously for both the gain-switched optical distributors and the gain-switched optical selectors. In another embodiment, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical amplifiers to be activated, thus routing the input signals at any of a plurality of given wavelengths to the corresponding output line (or lines if broadcasting capability is employed). Again, the rare earth-doped fiber optical amplifiers and the corresponding pumps are employed advantageously for both the gain-switched optical distributors and the gain-switched optical selectors.

DETAILED DESCRIPTION

Figure 1:
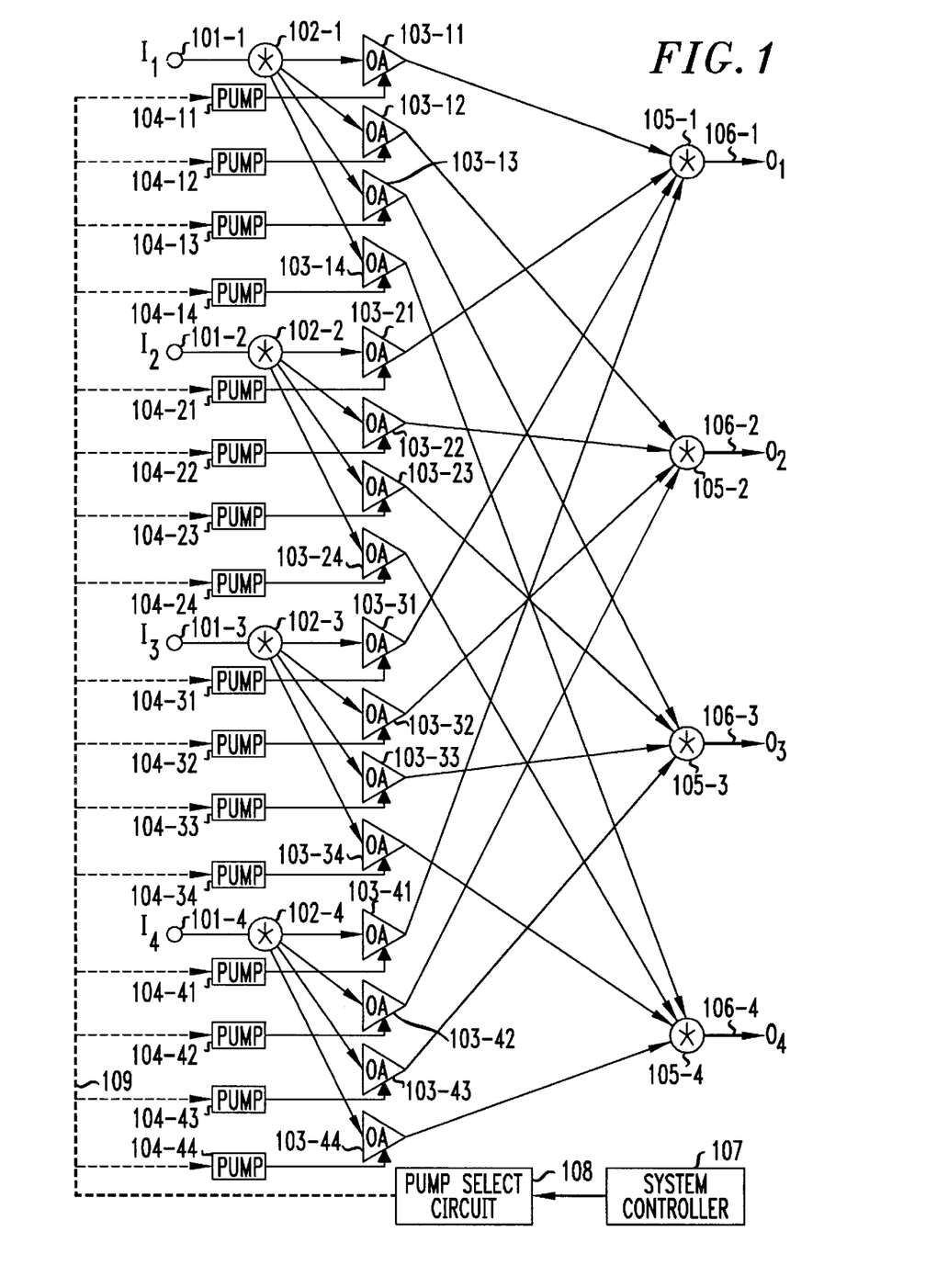
FIG. 1 illustrates one embodiment of the loss-less optical cross-connect arrangement utilizing gain-switched optical distributors and gain-switched optical selectors that employ the same so-called switched pumps with rare earth-doped fiber optical amplifiers in the distributors and selectors.

FIG. 1 illustrates one embodiment of a loss-less optical cross-connect arrangement utilizing gain-switched optical distributors and gain-switched optical selectors that employ the same so-called switched pumps with rare earth-doped fiber optical amplifiers in the gain-switched optical distributors and selectors. In this example, a so-called 4×4 loss-less optical cross-connect arrangement is shown. Specifically shown are inputs 101-1 (I1) through 101-4 (I4) which supply incoming optical signals to corresponding optical star couplers 102-1 through 102-4, respectively. Each of optical star couplers 102 couple the respective optical signals to corresponding optical rare earth-doped fiber optical amplifiers 103. In this example, optical star coupler 102-1 couples an incoming optical signal on input 101-1 to each of optical amplifiers 103-11 through 103-14, optical star coupler 102-2 couples an incoming optical signal on input 101-2 to each of optical amplifiers 103-21 through 103-24, optical star coupler 102-3 couples an incoming optical signal on input 101-3 to each of optical amplifiers 103-31 through 103-34 and optical star coupler 102-4 couples an incoming optical signal on input 101-4 to each of optical amplifiers 103-41 through 103-44. Optical amplifiers 103 may be ,for example, one of those shown in FIGS. 2A and 2B and described below. Each of optical amplifiers 103 is, in this example pumped by a corresponding one of pumps 104. Thus, optical amplifiers 103-11 through 103-14 are pumped by pumps 104-11 through 104-14, respectively, optical amplifiers 103-21 through 103-24 are pumped by pumps 104-21 through 104-24, respectively, optical amplifiers 103-31 through 103-34 are pumped by pumps 104-31 through 104-34, respectively and optical amplifiers 103-41 through 103-44 are pumped by pumps 104-41 through 104-44, respectively. The individual one or more of pumps 104 that are selected is controlled by system controller 107 and pump control circuit 108. The optical output signals from optical amplifiers 103 are supplied to particular ones of optical star couplers 105 and, thereafter, to particular ones of optical output fibers 106. In this example, the optical outputs from optical amplifiers 103-11, 103-21, 103-31 and 103-41 are supplied to optical star coupler 105-1 and, thereafter, to output optical fiber 106-1 (O1), the optical outputs from optical amplifiers 103-12, 103-22, 103-32 and 103-42 are supplied to optical star coupler 105-2 and, thereafter, to output optical fiber 106-2 (O2), the optical outputs from optical amplifiers 103-13, 103-23, 103-33 and 103-43 are supplied to optical star coupler 105-3 and, thereafter, to output optical fiber 106-3 (O3), and the optical outputs from optical amplifiers 103-14, 103-24, 103-34 and 103-44 are supplied to optical star coupler 105-4 and, thereafter, to output optical fiber 106-4 (O4).

Figure 8:
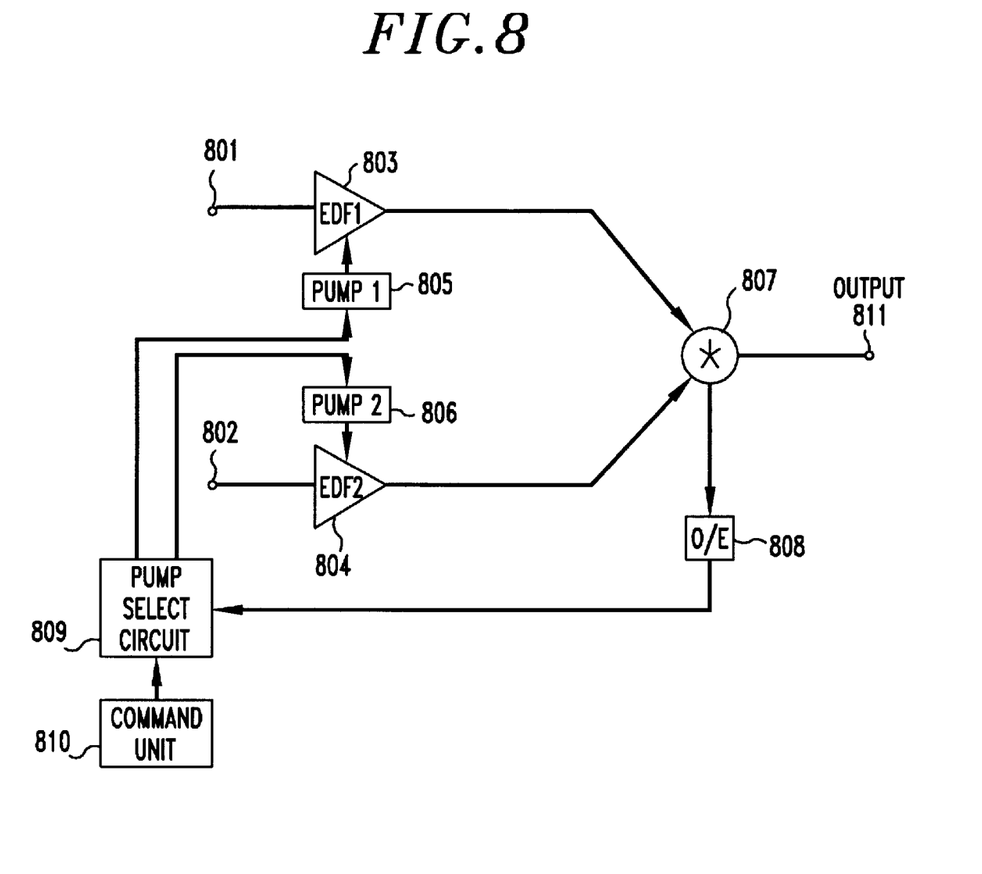
FIG. 8 illustrates an optical selector employing so-called switched pumps with rare earth-doped fiber optical amplifiers.
Figure 9:
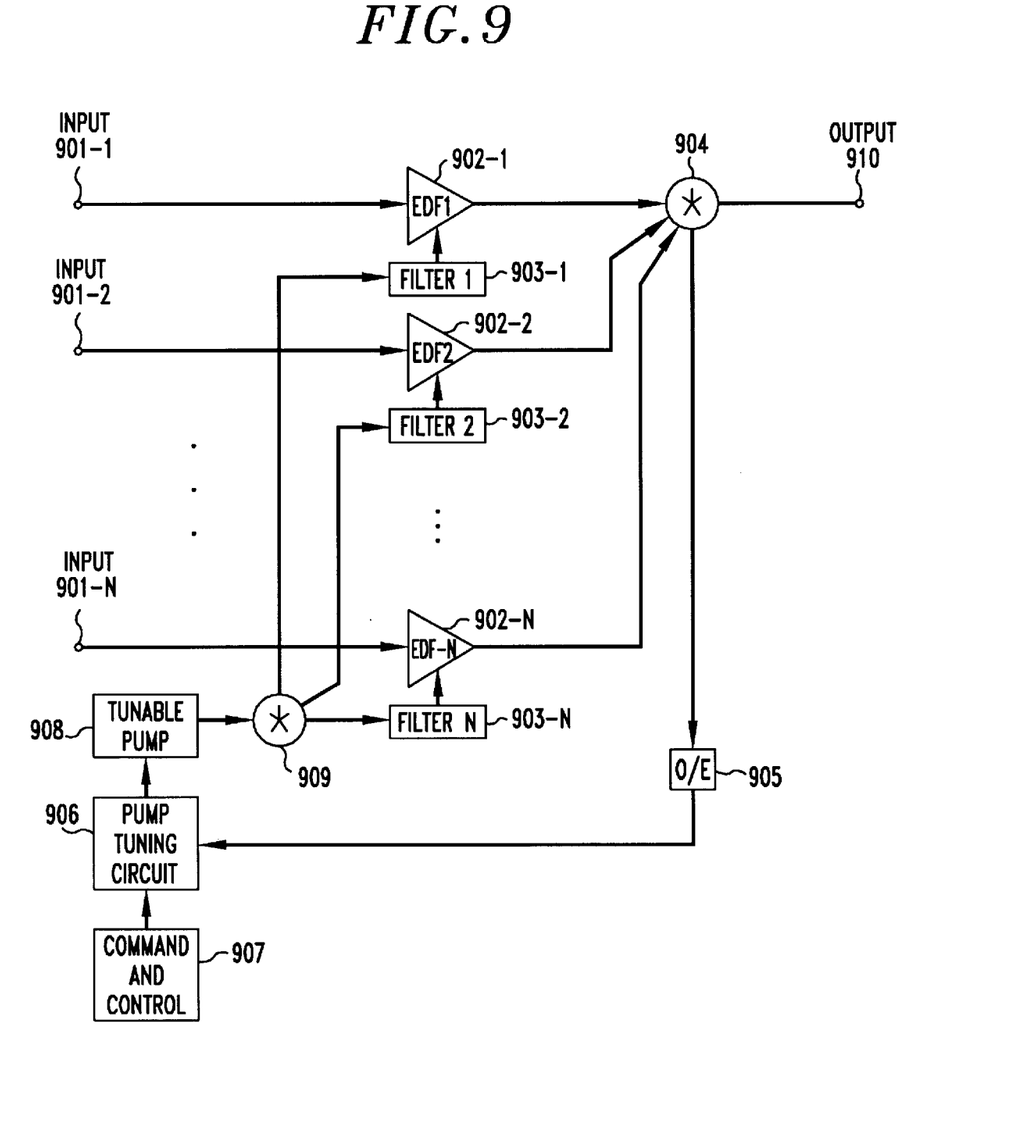
FIG. 9 shows an optical selector employing a tuned-pump arrangement including rare earth-doped fiber optical amplifiers.
Figure 10:
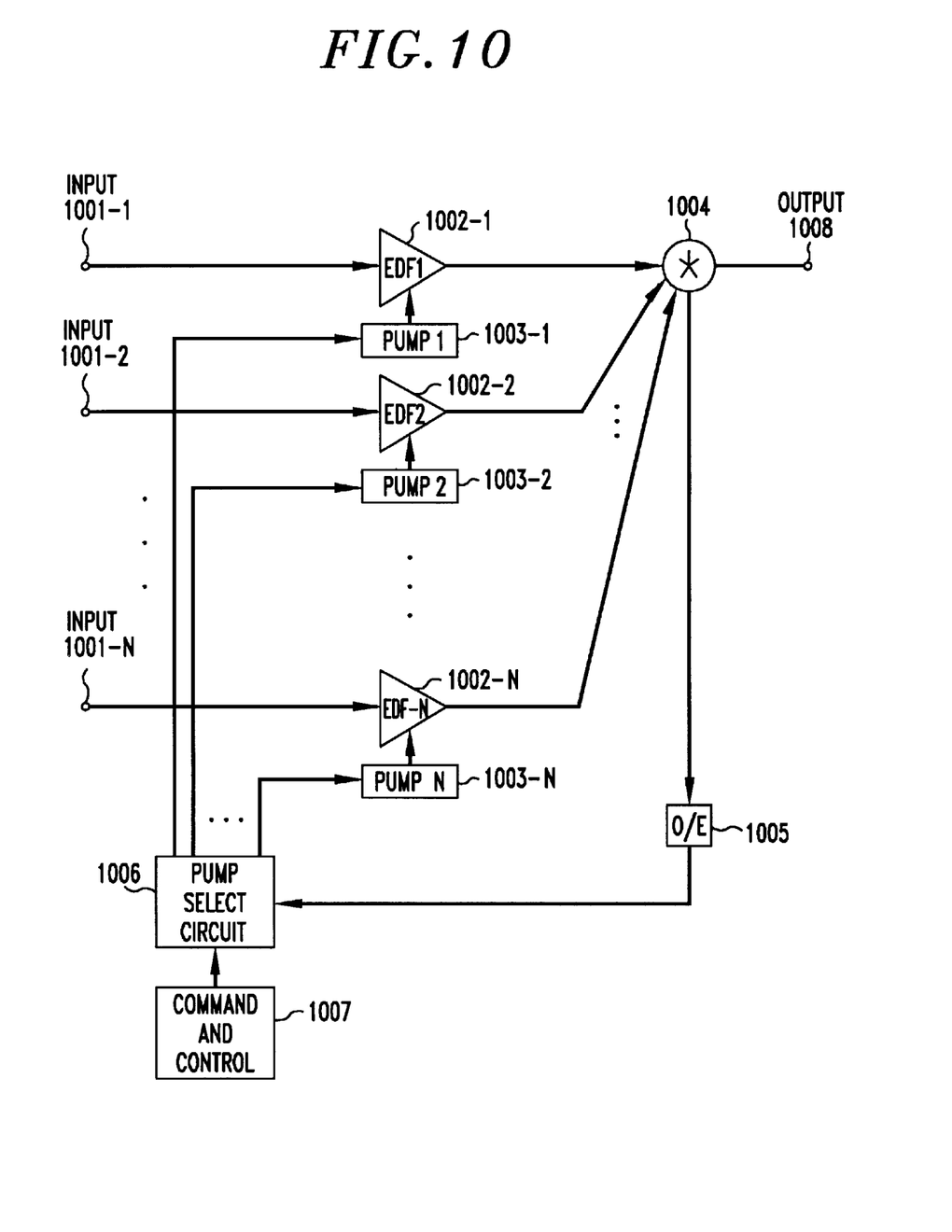
FIG. 10 shows an optical selector that utilizes a switched-pump arrangement including a plurality of pumps and corresponding rare earth-doped fiber optical amplifiers.

It should be noted that the gain-switched optical distributor portion of the optical cross-connect arrangement of FIG. 1 and the gain-switched optical selector portion both employ the same optical amplifier and corresponding pump. This a distinct advantage because of the savings regarding the need to use additional optical amplifiers and pumps. Additionally, the individual ones of optical amplifiers 103 that are ON or OFF under control of its corresponding pump 104 is further described below regarding the examples of gain-switched optical distributors (FIGS. 5–7) and of gain-switched optical selectors (FIGS. 8–10).

Further note that the optical cross-connect of FIG. 1 has non-blocking connectivity from any input 101 to any output 106. Additionally, via appropriately enabling optical amplifiers 103, an optical signal can be broadcast from any of inputs 101 to a plurality of outputs 106. Similarly, a collection of incoming optical signals from a corresponding plurality of inputs 101 can be supplied to one or more of outputs 106. This can be advantageously employed in multi-wavelength optical networks. Additionally, notwithstanding that an example of a 4×4 optical cross-connect has been described for brevity and clarity of exposition, it will be apparent to those skilled in the art that the optical cross-connect of FIG. 1 can readily be expanded to an M×M cross-connect.

Figure 2A:
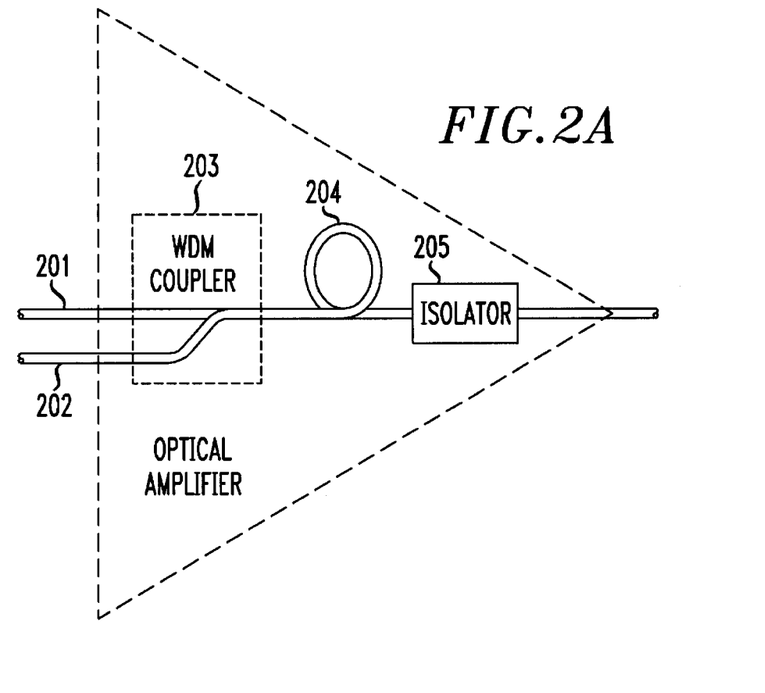
FIGS. 2A and 2B show, in simplified form, two gain-switched optical amplifier arrangements, each of which may be employed in the embodiments of the invention.
Figure 2B:
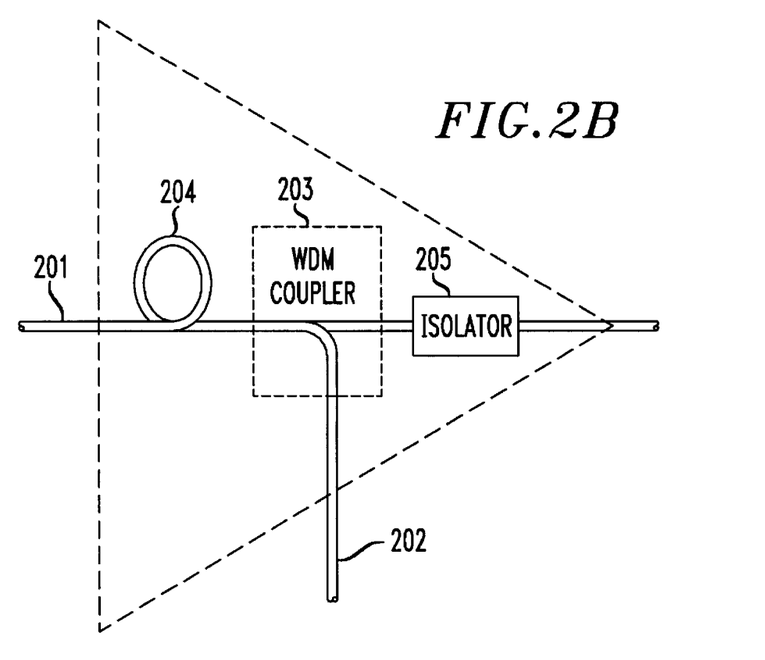

FIGS. 2A and 2B show, in simplified form, two gain-switched optical amplifiers which may be employed in the embodiments of the invention. Specifically, FIG. 2A shows a gain-switched optical amplifier employing co-directional pumping. Thus, shown are input terminal 201 which supplies an input optical signal to the optical amplifier through, in this example, wavelength division multiplexed (WDM) coupler 203 and input 202 through which a pump signal is supplied to the optical amplifier also through, in this example, wavelength division multiplexed (WDM) coupler 203. Also shown are a rare earth doped-fiber optical amplifier 204, which may be a desired length of, for example, erbium doped optical fiber, however, other rare earth-doping elements may also be advantageously employed. An optional optical isolator 205 is also shown. The elements employed in the optical amplifier shown in FIG. 2B are the same as those employed in FIG. 2A, the difference being that counter directional pumping is employed. Consequently, WDM coupler 203 is placed in the out put of rare earth-doped fiber optical amplifier 204 before the optional optical isolator 205. Additionally, it should be noted that the pumping could also be bidirectional. Further note that loss is equalized by the length of the rare earth-doped fiber and gain is equalized by the pump power.

Figure 3:
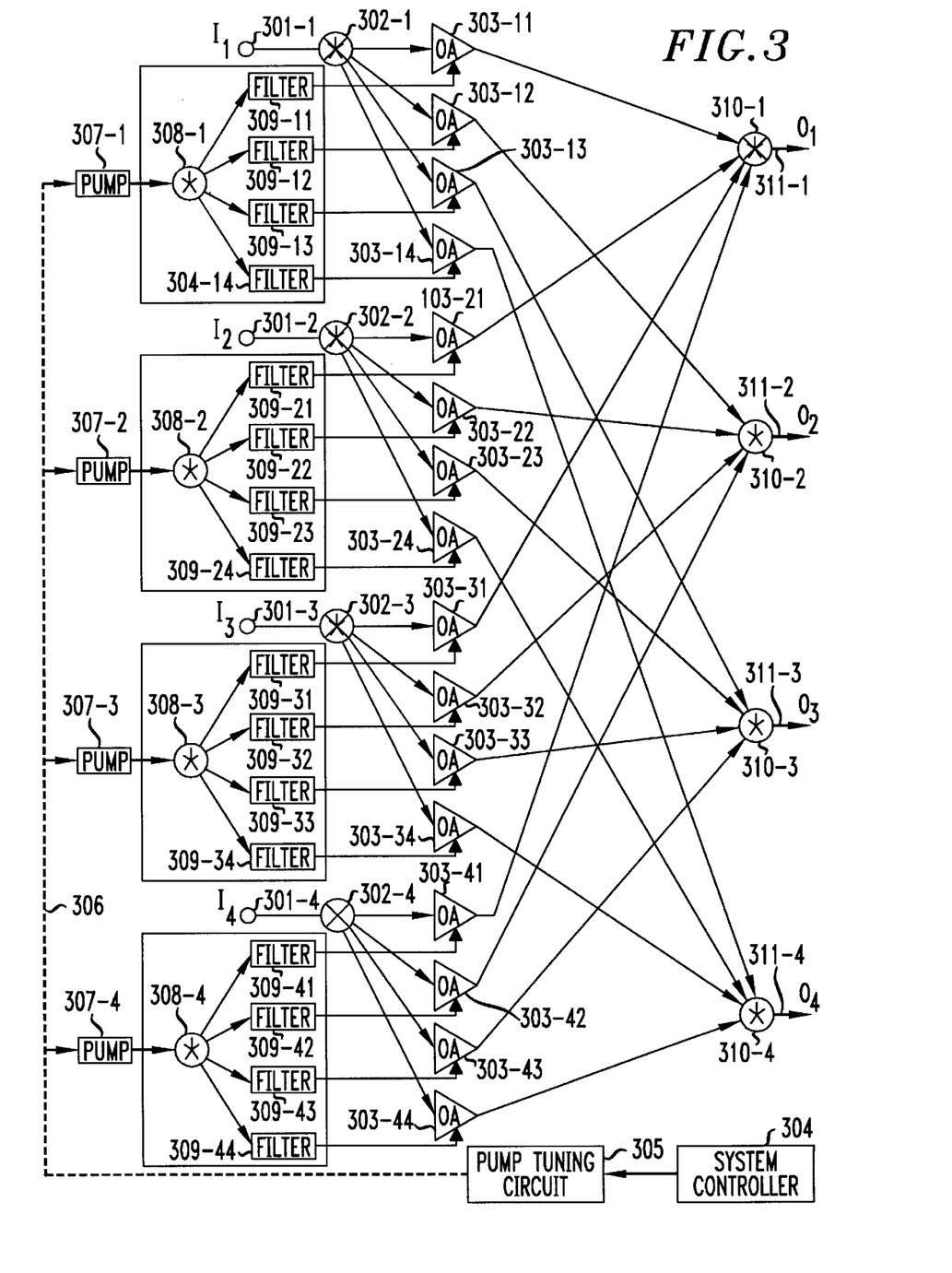
FIG. 3 shows another embodiment of the loss-less optical cross-connect arrangement employing a tuned-pump arrangement including rare earth-doped fiber optical amplifiers.

FIG. 3 shows another embodiment of the loss-less optical cross-connect arrangement employing a tuned-pump arrangement including rare earth-doped fiber optical amplifiers in the gain-switched optical distributors and selectors. In this example, a so-called 4×4 loss-less optical cross-connect arrangement is shown. Specifically shown are inputs 301-1 (I1) through 301-4 (I4) which supply incoming optical signals to corresponding optical star couplers 302-1 through 302-4, respectively. Each of optical star couplers 302 couple the respective optical signals to corresponding optical rare earth-doped fiber optical amplifiers 303. In this example, optical star coupler 302-1 couples an incoming optical signal on input 301-1 to each of optical amplifiers 303-11 through 303-14, optical star coupler 302-2 couples an incoming optical signal on input 301-2 to each of optical amplifiers 303-21 through 303-24, optical star coupler 302-3 couples an incoming optical signal on input 301-3 to each of optical amplifiers 303-31 through 303-34 and optical star coupler 302-4 couples an incoming optical signal on input 301-4 to each of optical amplifiers 303-41 through 303-44. Optical amplifiers 303 may be, for example, one of those shown in FIGS. 2A and 2B and described above. Each of optical amplifiers 303 is, in this example, pumped by a corresponding one of pumps 307, which, in this example are tuned pumps, via a corresponding one of filters 309. Thus, optical amplifiers 303-11 through 303-14 are pumped by pump 307-1 via filters 309-11 through 309-14, respectively, optical amplifiers 303-21 through 303-24 are pumped by pump 307-2 via filters 309-21 through 309-24, respectively, optical amplifiers 303-31 through 303-34 are pumped by pump 307-3 via filters 309-31 through 309-34, respectively and optical amplifiers 303-41 through 303-44 are pumped by pump 307-4 via filters 309-41 through 309-44, respectively.

The tuning of the individual one or more of pumps 307 that are selected is controlled by system controller 304 and pump tuning circuit 305. The pump control signals are supplied to tunable pumps 307 via bus 306. The optical output signals from optical amplifiers 303 are supplied to particular ones of optical star couplers 310 and, thereafter, to particular ones of optical output fibers 311. In this example, the optical outputs from optical amplifiers 303-11, 303-21, 303-31 and 303-41 are supplied to optical star coupler 310-1 and, thereafter, to output optical fiber 311 -1 (O1), the optical outputs from optical amplifiers 303-12, 303-22, 303-32 and 303-42 are supplied to optical star coupler 310-2 and, thereafter, to output optical fiber 311-2 (O2), the optical outputs from optical amplifiers 303-13, 303-23, 303-33 and 303-43 are supplied to optical star coupler 310-3 and, thereafter, to output optical fiber 311-3 (O3), and the optical outputs from optical amplifiers 303-14, 303-24, 303-34 and 303-44 are supplied to optical star coupler 310-4 and, thereafter, to output optical fiber 311-4 (O4).

It should be noted that the gain-switched optical distributor portion of the optical cross-connect arrangement of FIG. 3 and the gain-switched optical selector portion both employ the same optical amplifier and corresponding pump. This a distinct advantage because of the savings regarding the need to use additional optical amplifiers and pumps. Additionally, the individual ones of optical amplifiers 303 that are ON or OFF under control of its corresponding tunable pump 307 and corresponding filter 309 is further described below regarding the examples of gain-switched optical selectors (FIGS. 5–7) and of gain-switched optical selectors (FIGS. 8–10).

Further, note that the optical cross-connect of FIG. 3 has non-blocking connectivity from any input 301 to any output 311. Additionally, via appropriately enabling optical amplifiers 303, an optical signal can be broadcast from any of inputs 301 to a plurality of outputs 311. Similarly, a collection of incoming optical signals from a corresponding plurality of inputs 301 can be supplied to one or more of outputs 311. This can be advantageously employed in multi-wavelength optical networks. Additionally, notwithstanding that an example of a 4×4 optical cross-connect has been described for brevity and clarity of exposition, it will be apparent to those skilled in the art that the optical cross-connect of FIG. 3 can readily be expanded to an M×M cross-connect.

Figure 4:
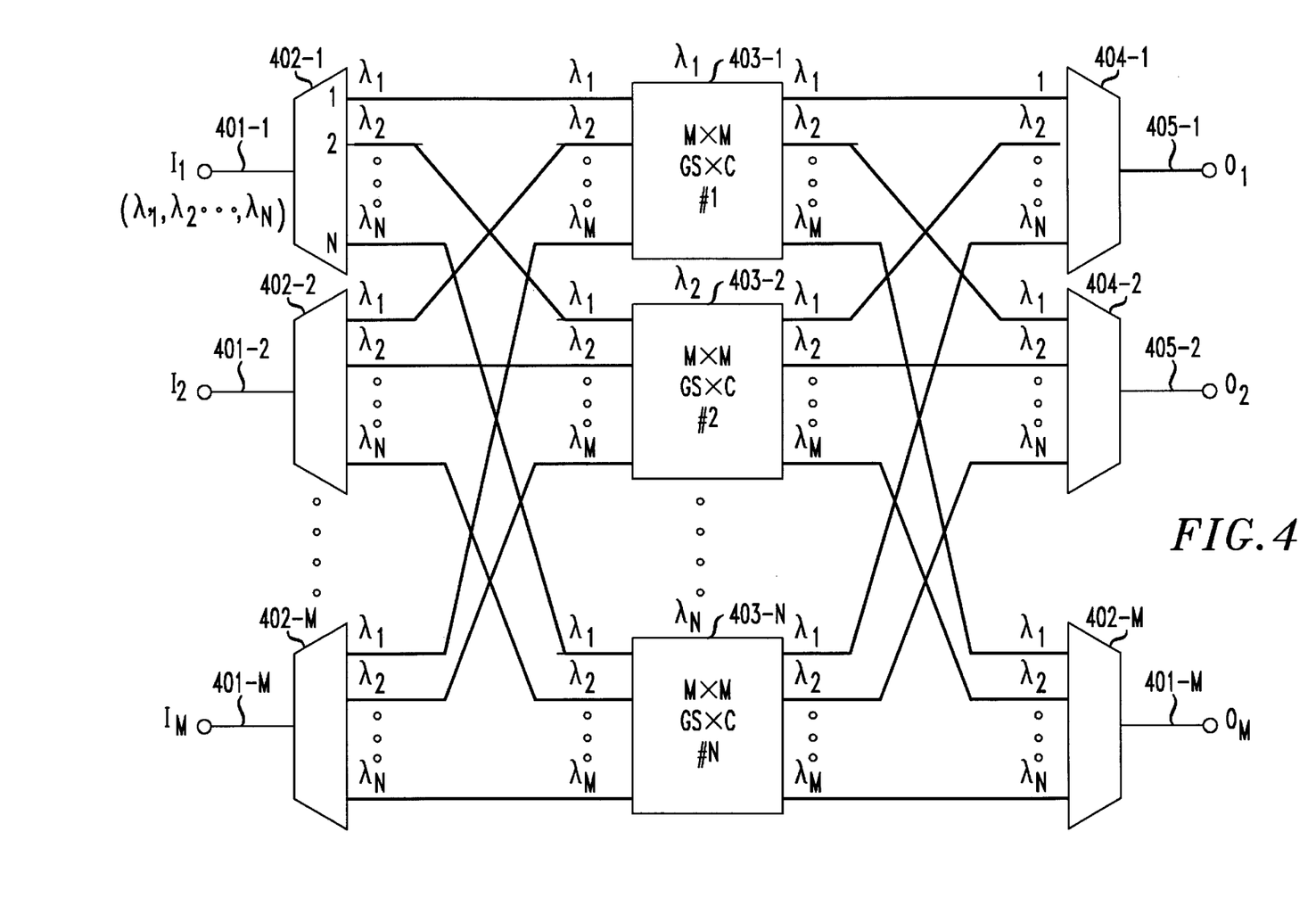
FIG. 4 shows another embodiment of the invention employed as a loss-less wavelength-selective optical cross-connect arrangement for use in multi-wavelength optical communications networks.

FIG. 4 shows another embodiment of the invention employed as a loss-less wavelength-selective optical cross-connect arrangement for use in gain-switched multiwavelength optical communications networks. Specifically, shown are a plurality of optical inputs 401-1 (I1) through 410-M (IM) for receiving incoming optical signals, each having multiple wavelengths, namely, λ1 through λN. The incoming optical signals are supplied from inputs 401-1 through 401-M to wavelength demultiplexer units 402-1 through 402-M, respectively. The outputs from units 402-1 through 402-M, namely, λ1 through λN are supplied to corresponding ones of single wavelength gain-switched cross-connect units 403-1 through 403-N. Each of cross-connect units 403 is, in this example, an M×M gain-switched cross-connect, which may comprise either of the cross-connect units shown in FIG. 1 or FIG. 3, and described above. Thus, in this example, all M of the incoming optical signals having wavelength λ1 from demultiplexer units 402 are supplied to M×M gain-switched cross-connect unit 403-1, all M of the incoming optical signals having wavelength λ2 from demultiplexer units 402 are supplied to M×M gain-switched cross-connect unit 403-2 and so on until all M of the incoming optical signals having wavelength λN from demultiplexer units 402 are supplied to M×M gain-switched cross-connect unit 403-N. Optical outputs from cross-connect units 403 are supplied to corresponding ones wavelength multiplexer units 404 and, thereafter to corresponding ones of optical output fiber 405. In this example, all M of the optical signal outputs having wavelength λ1 from cross-connect unit 403-1 are supplied on a one-to-one basis to wavelength multiplexer units 404-1 through 404-M, all M of the optical signal outputs having wavelength λ2 from cross-connect unit 403-2 are supplied on a one-to-one basis to wavelength multiplexer units 404-1 through 404-M and so on until all M of the optical signal outputs from cross-connect unit 403-N having wavelength λN are supplied on a one-to-one basis to wavelength multiplexer units 404-1 through 404-M. Multiplexer units 404-1 through 404-M wavelength multiplex the supplied optical signals and, thereafter, supply the wavelength multiplex optical signals each including wavelengths λ1 through λN to optical output fibers 405-1 through 405-M, respectively.

Note that the optical cross-connect of FIG. 4 has non-blocking connectivity from any input 401 having any wavelength λ to any output 405. Additionally, via appropriately controlling cross-connect units 403, an optical signal having any wavelength λ can be broadcast from any of inputs 401 to a plurality of outputs 405. Similarly, a collection of incoming optical signals from a corresponding plurality of inputs 401 can be supplied to one or more of outputs 405. This can be advantageously employed in multi-wavelength optical networks by use of the cross-connect of FIG. 4.

Figure 5:
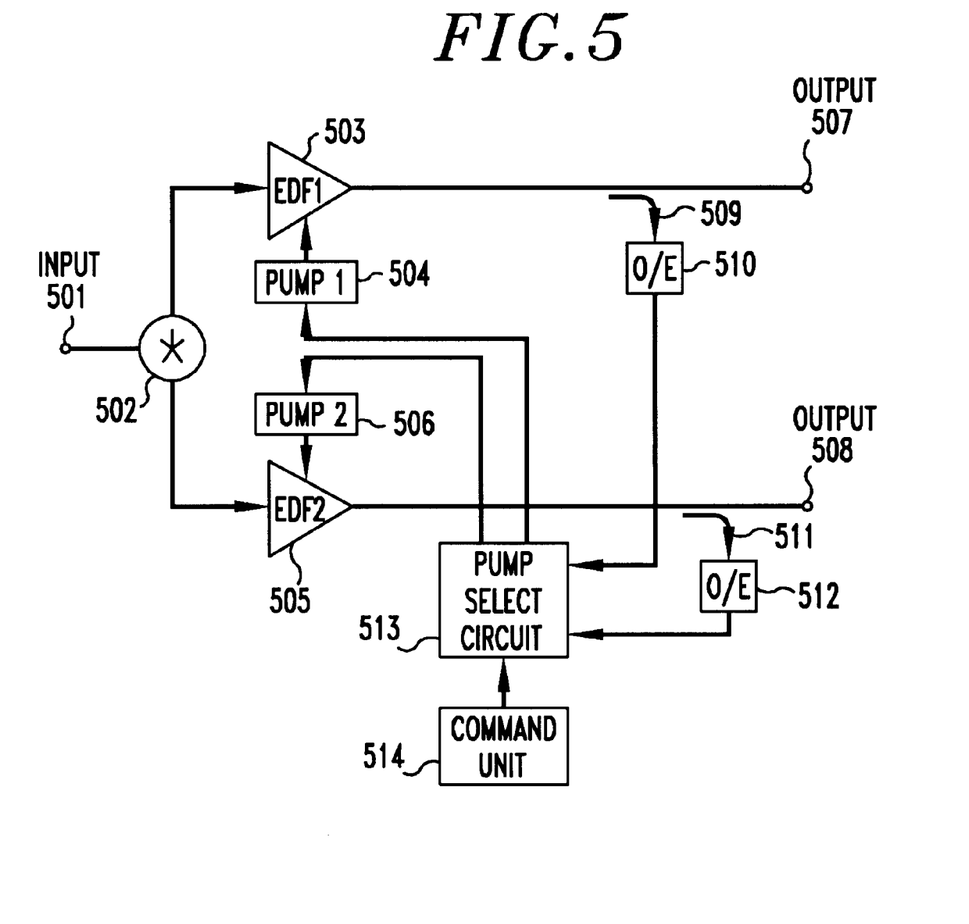
FIG. 5 illustrates an optical distributor that employs so-called switched pumps with rare earth-doped fiber optical amplifiers.

FIG. 5 shows, in simplified form, a gain-switched optical distributor including optical fiber line 501 which supplies optical signals at predetermined wavelengths or sets of wavelengths to rare earth-doped fiber optical amplifier (herein after "amplifier") 503 and amplifier 504, respectively, (see FIGS. 2A and 2B) via the optical star coupler (herein after "coupler") 502. The rare earth-doped fiber can be, for example, a length of erbium-doped fiber coupled to a wavelength selective coupler through which a pump is coupled thereto. As shown, pump 504 is coupled to amplifier 503, and pump 506 is coupled to amplifier 505. As is known in the art, each of pumps 504 and 506, respectively, powers amplifiers 503 and 505. The inputs of the amplifiers 503 and 505 are identical copies of the input signal on line 501 provided by coupler 502, which in this example is a 2×N coupler, in well-known fashion. The outputs of the amplifiers 503 and 504 are connected to the output ports 507 and 508 via the optional optical monitoring taps (herein after "taps") 509 and 511. Taps 509 and 511 tap off a small fraction (for example 1–10%) of the output optical signals and rout the optical signals to the photo-detectors (optical to electrical converters, O/E) 510 and 512, respectively. O/Es 510 and 512 help in the processes of determining which of amplifiers 503 and 504 are currently selected by the power level of the selected line and determining the parameters and identification (ID) tags associated with selected lines (see for example, co-pending U.S. patent application Ser. No. 08/579529, filed Dec. 27, 1995 now U.S. Pat. No. 5,745,274, issued Apr. 28, 1998). The information from O/Es 510 and 512 are supplied to pump selector circuit 513 which then selects either pump 504 or pump 506, in accordance with desired parameters, and commands from the command and control unit 514. It should be noted, however, that this monitoring arrangement is optional and other optical monitoring and control arrangements known in the art may be equally employed. This will be apparent to those skilled in the art. Also supplied to pump select circuit 513 are command and control information from command and control unit 514 which is utilized with information from other network elements in an optical system in order to select which of pumps 504 or 506 is to be selected and, accordingly, which of amplifiers 503 or 505 will be switched ON and which will be switched OFF. It should be noted, however, that although we have shown the employment of O/Es 510 and 512, in this example, that other arrangements may be employed to monitor different parameters in order to select which of pumps 504 and 506 and, accordingly, which of amplifiers 503 and 505 will-be switched ON.

Figure 6:
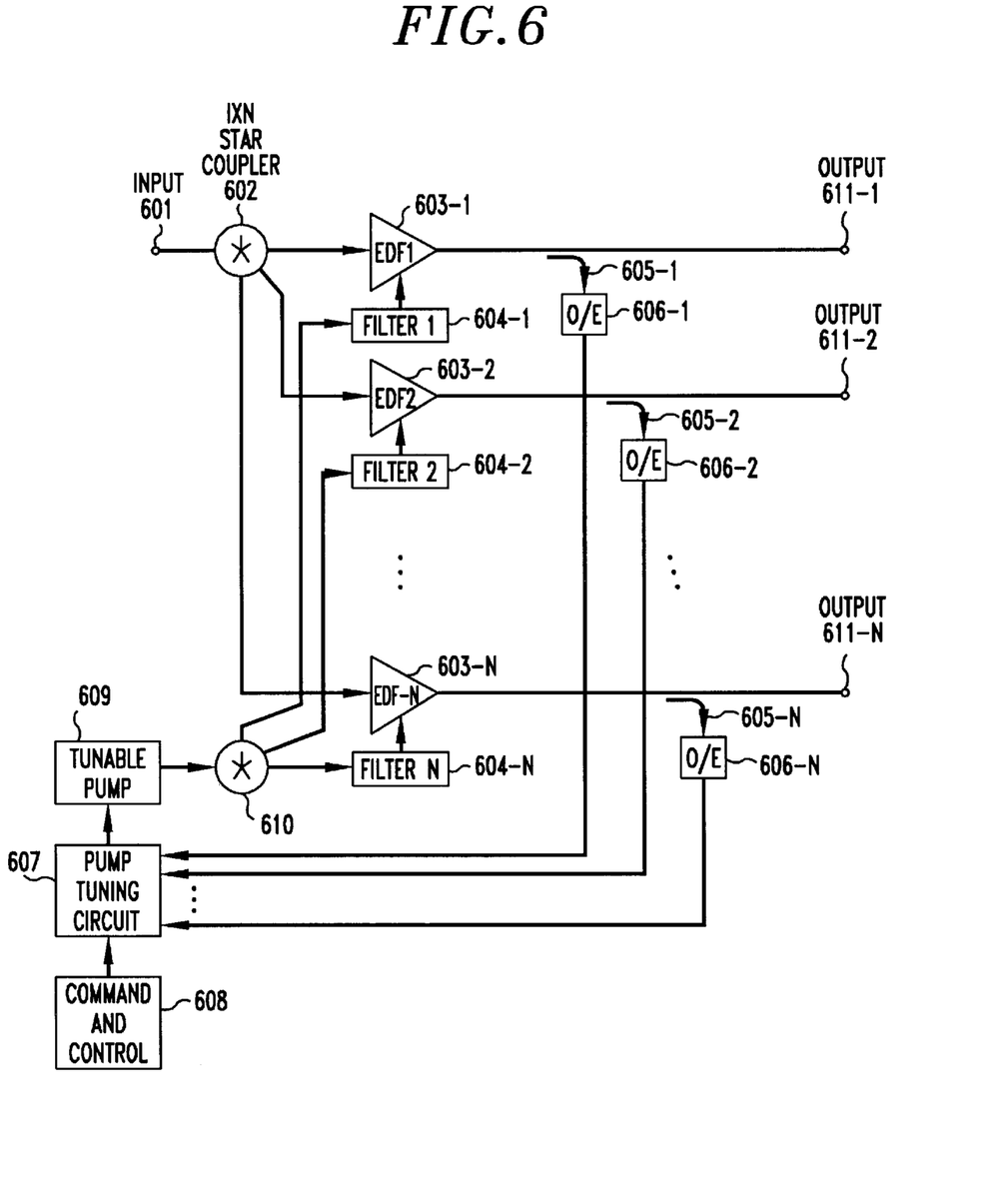
FIG. 6 shows an optical distributor that utilizes a tuned-pump arrangement including rare earth-doped fiber optical amplifiers.

FIG. 6 shows, in simplified form, another gain-switched optical distributor for distributing an optical signal from an input optical fiber line 601 to a plurality of output optical fiber lines 611-1 through 611-N and a corresponding plurality of amplifiers 603-1 through 603-N. Note that only one tunable pump 609 is required which gives us the technical advantage of cost savings. Associated with tunable pump 609 are another optical star coupler (herein after "coupler") 610 and a plurality of fixed (or presetable) optical band pass filters (herein after "filters") 604-1 through 604-N which are associated on a one-to-one basis with amplifiers 602-1 through 602-N, respectively. In practice, these filters, 602-1 through 602-N, may be built into the wavelength selective coupler(s) that are used to build the amplifiers 603-1 through 603-N (see the literature for structural details of various optical amplifier designs). Again, the outputs of amplifiers 602-1 through 602-N are supplied to the optional taps 605-1 through 605-N for the purpose of being monitored for integrity by the monitors 606-1 through 606-N, prior to being routed to the system output ports 611-1 through 611-N. Again, the outputs of the O/E devices 606-1 through 606-N are combined in the pump tuning circuit 607 with information from the command and control unit 608 to tune the wavelength of the tunable pump 609.

Figure 7:
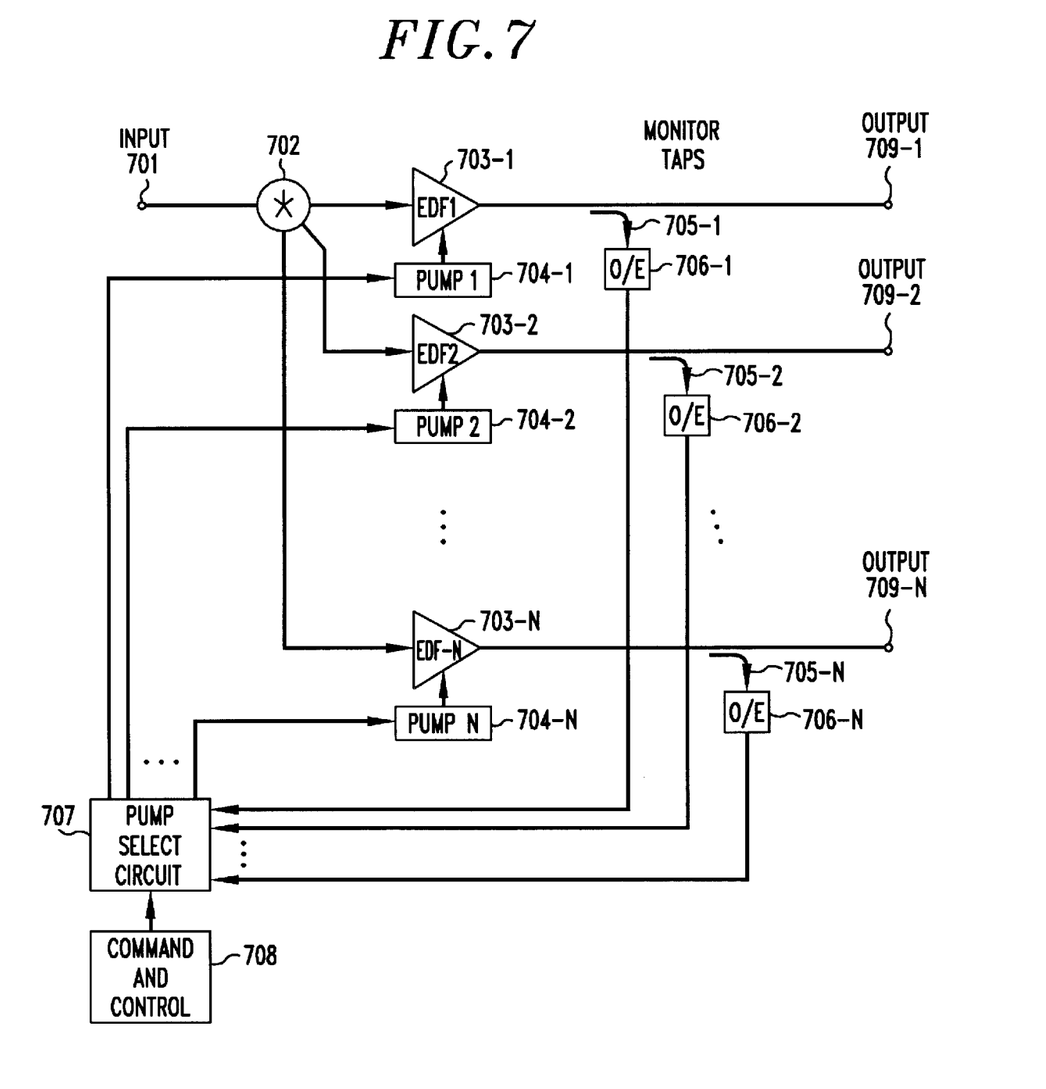
FIG. 7 shows an optical distributor arrangement including a plurality of switched pumps and corresponding rare earth-doped fiber optical amplifiers.

FIG. 7 shows, in simplified block diagram form, another gain-switched optical distributor employing a single input line 701 and a plurality of output optical fiber lines 709-1 through 709-N and a corresponding plurality of amplifiers 703-1 through 703-N. Note that a corresponding plurality of pumps 704-1 through 704-N are associated with amplifiers 703-1 through 703-N, respectively. Again, the outputs of amplifiers 703-1 through 703-N are supplied to the taps 705-1 through 705-N for the purposed of being monitored for integrity by the O/Es 706-1 through 706-N, prior to being routed to the system output ports 709-1 through 709-N. Again, the outputs of the O/E devices 706-1 through 706-N are combined in the pump select circuit 707 with information from the command and control unit 708 to activate one (or more, if broadcast is desired) of the pumps 704-1 though 704-N and, consequently, then the turning the corresponding amplifier(S) 703-1 though 703-N ON or OFF. It should be noted, however, that other optical coupling and monitoring arrangements known in the art may be equally employed in place of optical couplers 705-1 through 705-N and the associated components. This will be apparent to those skilled in the art. Specifically, in this example, O/Es 703-1 through 703-N each monitor the power level of an output signal on an associated one of output fibers 705-1 through 705-N, and determines the parameters and ID tags associated with that signal for verification of the operation and quality of the distributor switch.

FIG. 8 shows, in simplified form, a gain-switched optical selector including optical fiber lines 801 and 802 which supply optical signals at predetermined wavelengths or sets of wavelengths to rare earth-doped optical fiber amplifier (herein after "amplifier") 803 and amplifier 804, respectively. The rare earth doped optical fiber can be, for example, a length of erbium doped fiber coupled to a wavelength selective coupler through which a pump is coupled thereto. As shown, pump 805 is coupled to amplifier 803, and pump 806 is coupled to amplifier 804. As is known in the art, each of pumps 805 and 806 respectively powers amplifiers 803 and 804. The outputs of the amplifiers 803 and 804 are combined by an optical star-coupler (herein after "coupler") 807, in well-known fashion. The coupler 807, for a two-optical line arrangement, is known as a 3dB coupler. The primary output of the coupler 807 is supplied to output optical fiber 811, which may be connected to a receiver or to a long distant transport fiber. The secondary output of coupler 807 is supplied to an optical to electrical converter (O/E) 808, which monitors the power level of the selected line and determines the parameters and ID (identification) tags associated with selected lines (see for example, co-pending U.S. patent application Ser. No. 08/579529, filed Dec. 27, 1995 now U.S. Pat. No. 5,745,274, issued Apr. 28, 1998). The information from O/E 808 is supplied to pump selector 809, which then selects either pump 805 or pump 806, in accordance with desired parameters. It should be noted, however, that other optical coupling arrangements known in the art may be equally employed in place of coupler 807. This will be apparent to those skilled in the art. It should be noted that the secondary output from coupler 807 which is supplied to OJE 808 is optional. The output from O/E 808 is supplied to pump select circuit 809, where it is employed to further refine the pump selection process. Specifically, in this example, O/E 808 monitors the power level of the selected signal and determines the parameters and ID tags associated with the selected line(s) being supplied to coupler 807. Also supplied to pump select circuit 809 are command and control information from command and control unit 810, which is utilized with information from other network elements in an optical system in order to select which of pumps 805 or 806 is to be selected and, accordingly, which of amplifiers 803 or 804 will be supplying an optical signal via coupler 807 to output optical fiber 811 as an output. It should be noted, however, that although we have shown the use of O/E 808, in this example, that other arrangements may be employed to monitor different parameters in order to select which of pumps 805 and 806 and, accordingly, which of amplifiers 803 and 804 will be supplying the output.

FIG. 9 shows in simplified form another gain-switched optical selector for selecting an optical signal from a plurality of optical fiber lines 901-1 through 901-N and a corresponding plurality of rare amplifiers 902-1 through 902-N. In gain-switched optical selector only one tunable pump 908 is employed, which is coupled to each of filters 903-1 through 903-N though optical star coupler (herein after "coupler) 909, which gives us the technical advantage of cost savings. The plurality of filters 904-1 through 904-N are associated on a one-to-one basis with amplifiers 903-1 through 903-N, respectively. Again, the outputs of amplifiers 902-1 through 902-N are supplied to optical star coupler (herein after "coupler") 904. The primary output of coupler 904 provides the system output and is supplied to output optical fiber 910, which may be connected to a receiver or to a long distant transport fiber. The secondary output of coupler 904 is supplied to a power monitor unit 905, which monitors the power level of the selected line and determines the parameters and ID (identification) tags associated with selected lines (see or example, co-pending U.S. patent application Ser. No. 08/579529, noted above). The information from O/E 905 is supplied to pump tuning circuit 906, which then selects one of pumps 903-1 through 903-N, in accordance with desired parameters. It should be noted, however, that other optical coupling arrangements known in the art may be equally employed in place of coupler 904. It should be noted, however, that although we have shown the use of O/E 905, in this example, that other arrangements may be employed to monitor different parameters in order to adjust pump tuning circuit 906 and, hence, tunable pump 908 and, accordingly, which of amplifiers 902-1 through 902-N will be supplying the output. This will be apparent to those skilled in the art. It should be noted that this secondary output from coupler 904 which is supplied to O/E 908 is optional. The output from O/E 905 is supplied to pump tuning circuit 906, where it is employed to further refine the pump selection process. Specifically, in this example, O/E 905 monitors the power level of the selected signal and determines the parameters and ID tags associated with the selected line(s) being supplied to coupler 904. Also supplied to pump tuning circuit 906 are command and control information from command and control unit 907, which is utilized with information from other network elements in an optical system in order to select which wavelength is to be selected and, accordingly, which of amplifiers 902-1 through 902-N will be supplying an optical signal via coupler 904 to output optical fiber 910 as an output. The output from tunable pump 308 is supplied via coupler 909 to filters 903-1 through 903-N which, in turn, select the appropriate one of amplifiers 902-1 through 902-N to supply an output to coupler 904.

FIG. 10 shows in simplified block diagram form, another gain-switched optical selector that employs a plurality of optical fiber lines 1001-1 through 1001-N and a corresponding plurality of rare earth doped optical fiber amplifiers (herein after "amplifiers") 1002-1 through 1002-N. In this gain-switched optical selector, a corresponding plurality of pumps 1003-1 through 1003-N are associated with amplifiers 1002-1 through 1002-N, respectively. The optical outputs from amplifiers 1002-1 through 1002-N, in this example, are supplied to an optical star-coupler (herein after "coupler") 1004. It should be noted, however, that other optical coupling arrangements known in the art may be equally employed in place of coupler 1004. This will be apparent to those skilled in the art. A primary output of star-coupler 1004 is supplied to output optical fiber 1008, while a secondary output from coupler 1004, in this example, is supplied to optical to electrical converter (O/E) 1005. It should be noted that this secondary output from coupler 1004 is optional. The output from O/E 1005 is supplied to pump select circuit 1006 where it is employed to further refine the pump selection process. Specifically, in this example, O/E 1005 monitors the power level of the selected signal and determines the parameters and ID tags associated with the selected line(s) being supplied to coupler 1004. Also supplied to pump select circuit 1006 are command and control information from command and control unit 1007 is utilized with information from other network elements in an optical system in order to select which of pumps 1003 are to be selected and, accordingly, which of amplifiers 1002 will be supplying an optical signal via coupler 1004 to output optical fiber 1008 as an output.

What is claimed is:

1. An optical cross-connect arrangement comprising:

a plurality of cross-connect inputs to which optical signals are to be supplied;

associated with each input is a number of fiber optical amplifiers, each having an input and an output, corresponding to the number of inputs, wherein each of the fiber optical amplifiers comprises an optical rare earth-doped fiber having a predetermined length and a corresponding filter;

an individual input optical coupler associated with each of said cross-connect inputs for supplying an incoming optical signal to each input of the fiber optical amplifiers associated with the particular cross-connect input;

a plurality of cross-connect outputs corresponding to the plurality of cross-connect inputs;

an individual output optical coupler being associated with each of the cross-connect outputs;

a pump arrangement responsive to command signals to optically control ON/OFF states of the plurality of fiber optical amplifiers associated with each of the cross-connect inputs so that incoming optical signals received at said cross-connect inputs can be supplied from any cross-connect input to any cross-connect output, the pump arrangement including a tunable pump and a pump tuning circuit and a coupler for coupling an output from the tunable pump to each of the filters corresponding to the plurality of fiber optical amplifiers, the pump tuning circuit being responsive to command and control signals for controlling the tunable pump to supply pumping signals for turning ON/OFF one or more of the plurality of fiber optical amplifiers, the filters filtering the pump signal to effect the turning ON/OFF of the one or more of the plurality of fiber optical amplifiers, wherein each input optical coupler and its associated plurality of fiber optical amplifiers including the associated pump arrangement form an optical distributor and each output optical coupler and its associated fiber optical amplifier supplying optical signals to it form an optical selector in such a manner that the same fiber optical amplifier and associated pump arrangement are employed for both the optical distributor and the optical selector.

2. The optical cross-connect of claim 1 wherein the fiber is doped with erbium.

3. The optical cross-connect of claim 1 wherein the pump arrangement associated with the rare earth-doped fiber is arranged to provide co-directional pumping of the rare earth-doped fiber optical amplifier.

4. The optical cross-connect of claim 1 wherein the pump arrangement associated with the rare earth-doped fiber is arranged to provide counter directional pumping of the rare earth-doped fiber optical amplifier.

* * * * *